United States Patent [19]

Gordon

[11] 4,226,424
[45] Oct. 7, 1980

[54] PLAYER LATCHING AND UNLATCHING MECHANISM FOR VIDEO DISC HOLDER

[76] Inventor: Geoffrey W. Gordon, 314 Arbutus St., Bloomington, Ind. 47401

[21] Appl. No.: 34,173

[22] Filed: Apr. 27, 1979

[51] Int. Cl.³ ............................................. G11B 25/04
[52] U.S. Cl. .................................. 274/9 B; 206/309; 360/133
[58] Field of Search ............... 274/9 B, 1 R; 206/309, 206/310, 311, 312; 312/7, 10, 12; 358/128, 128.5, 128.6; 360/86, 97, 99, 133; 179/100.1

[56] References Cited

U.S. PATENT DOCUMENTS

| 4,113,262 | 9/1978 | De Stephanis | 274/9 B |
| 4,138,703 | 2/1979 | Stave et al. | 360/97 |
| 4,164,782 | 8/1979 | Stewart | 360/133 |

*Primary Examiner*—John W. Shepperd
*Attorney, Agent, or Firm*—Woodard, Weikart, Emhardt & Naughton

[57] ABSTRACT

A mechanism for latching a disc holder to a frame while unlatching the holder from its carrier. A pair of pivotally mounted pry bars are extendable between the opposite edges of a video disc holder and its caddy to unlatch the holder from the caddy. A pair of pivotally mounted wedges are projectible into recesses provided on the disc holder to hookingly engage the holder while the caddy is removed therefrom. A pair of springs urge the wedges into the holder whereas a second pair of springs urge the pry bars relative to the wedges to allow the pry bars to be pivoted away from the holder. Reinsertion of the caddy to recapture the holder results in the pry bars being forced against the wedges thereby unlatching the holder from the wedges and allowing the holder to relatch to the caddy.

12 Claims, 8 Drawing Figures

PLAYER LATCHING AND UNLATCHING MECHANISM FOR VIDEO DISC HOLDER

BACKGROUND OF THE INVENTION

This invention is in the field of latching and unlatching mechanisms. More specifically, the mechanism is used to unlatch a video disc holder carried in a caddy and to then latch the disc holder to the player while the caddy is removed therefrom. Further, the mechanism is operable to allow the holder to relatch to the caddy in order that the disc may be removed from the player while simultaneously enclosed in the caddy.

Heretofore, difficulty has been encountered in providing a suitable latching mechanism for operation with a video disc holder and caddy. It has been known by others to latch the video disc holder into a caddy by means of spring-biased legs provided on the holder which project into the caddy. It has also been known by others to use a pry bar to then pry the spring-biased legs from the caddy in order to allow the holder to be removed from the caddy. Difficulty has been encountered in the industry to suitably grasp the holder when inserted into the player in such a manner that the unlatched caddy may be removed from the holder. One problem solved by the present invention is to provide a suitable hooking mechanism which will grasp simultaneously the holder at two separate locations thereby preventing the holder from becoming cocked within the player. Further, the invention disclosed herein provides means for coordinating the movement of the pry bar which unlatches the holder from the caddy with respect to the hooking mechanism for grasping the holder when inserted in the player. Such coordination has not heretofore been adequate thereby resulting in an unoperable mechanism.

SUMMARY OF THE INVENTION

One embodiment of the present invention is a device for removing and reinserting a playing disc holder enclosed in and releaseably latched to a caddy comprising a frame into which the caddy with holder may be inserted, a first pryor pivotally mounted to the frame to move parallel to a given plane from an initial inserting position to a removal position and having first unlatching means operable to unlatch the holder from the caddy when the caddy and holder are initially inserted into the frame positioning the unlatching means between the caddy and holder in the initial inserting position, the pryor having a control surface, a first hook movably mounted to the frame to move in a direction parallel to the plane, the hook including an outer end configured to hookingly engage the holder when the caddy is unlatched and removed apart from the holder, first spring means secured to the frame and the hook being operable to urge the outer end of the hook into latching engagement with the holder when the holder is inserted into the frame but yieldable to allow movement of the outer end of the hook to disengage the holder when the caddy is reinserted into the frame to recapture the holder contacting and forcing the pryor to move to the removal position and moving the control surface against the hook moving the hook from the holder, and second spring means connecting the pryor and hook together being operable to urge the unlatching means away from the holder once the first hook is latched to the holder and the caddy is removed therefrom.

Another embodiment of the present invention is a latch mechanism for operation with a disc holder enclosed in a caddy comprising a frame having an opening to receive the holder in caddy, a first pryor pivotally mounted to the frame to move in a first plane and including a bar extending forwardly toward the opening to engage and separate the caddy and holder, the pryor having a pryor seating surface, a first latch pivotally mounted to the frame to move in a direction parallel to the first plane, the latch having a main body with a latch seating surface which the pryor seating surface contacts, the latch having a projection outwardly therefrom to hookingly engage the holder when separated from the caddy, a pivot mounting the latch on the frame, a first spring mounted on the frame and connected to the latch to urge the projection into the holder, and a second spring connecting the pryor and latch together to urge the projection toward the latch and the latch away from the holder when the pryor seating surface is not in contact with the latch seating surface.

Yet a further embodiment of the present invention is a latch mechanism comprising a frame, a first latch having a first end and a second end with the first end pivotally mounted to the frame, the latch having a wedge-shaped hook extending upwardly therefrom in a direction from the first end toward the second end, a first spring mounted on the frame and connected to the second end to urge the hook upwardly in a given plane, a first pryor pivotally mounted to the frame to move parallel to the given plane and having a finger extending in a direction from the second end toward the first end, and a second spring connected to and between the latch and pryor to urge the latch and pryor together.

It is an object of the present invention to provide a mechanism for unlatching a video disc holder from its storage caddy while simultaneously holding the video disc holder within a player while the caddy is removed therefrom.

Yet another object of the present invention is to provide a new and improved mechanism for holding a device while the device is unlatched from its housing and to further enable the housing to subsequently recapture and remove the device from the mechanism.

In addition, it is an object of the present invention to provide a latch mechanism for operation with a disc holder enclosed in a caddy wherein the holder is held consistently in the same position upon repeated latching of the mechanism to the holder.

Related objects and advantages of the present invention will be apparent from the following description.

DESCRIPTION OF THE PREFERRED EMBODIMENTS

Figure 1:
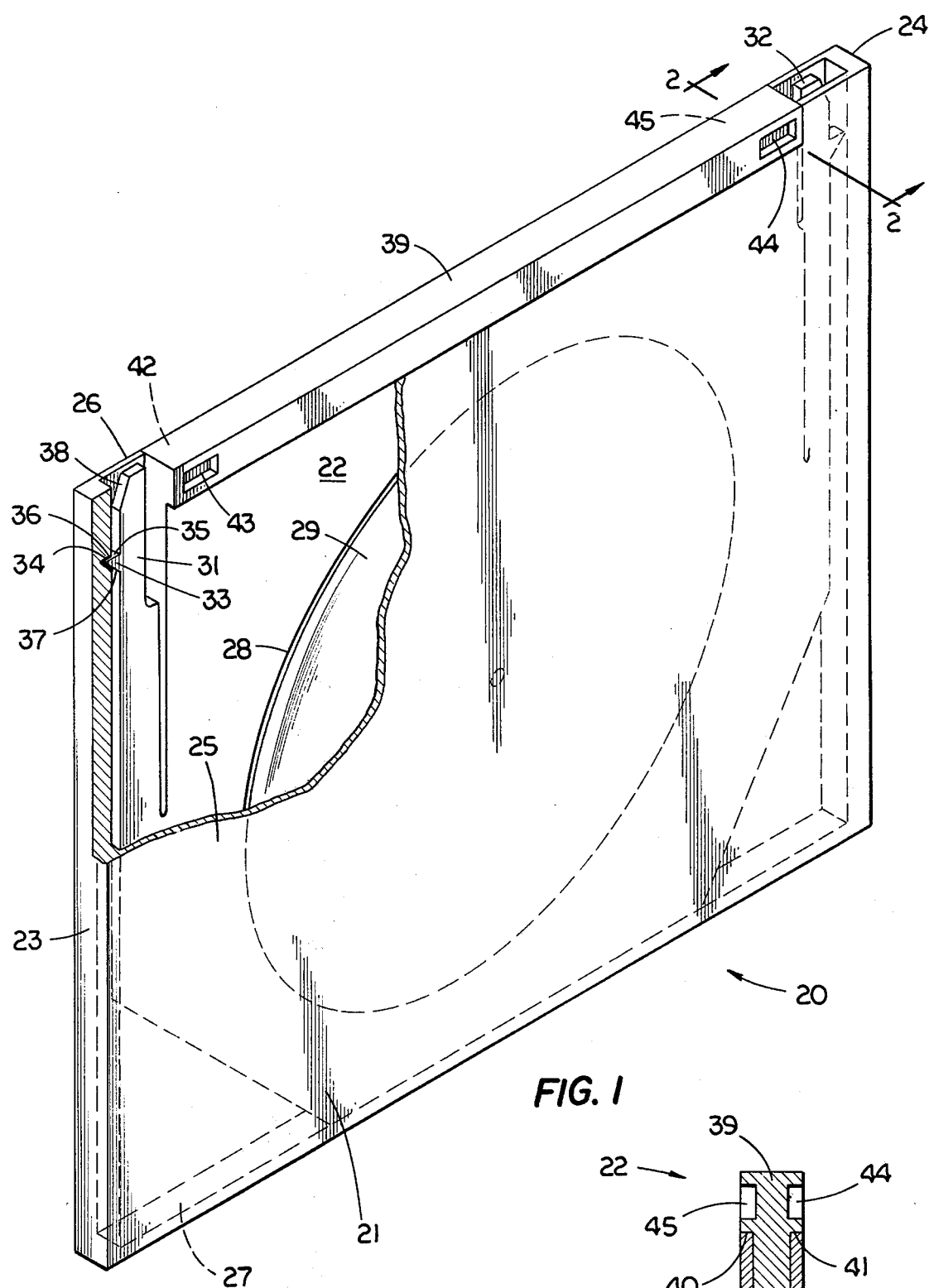
FIG. 1 is a fragmentary perspective view of a caddy with a video disc enclosed with a holder.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a device 20 which contains a disc upon which video information is provided in the form of grooves. Device 20 is intended to be inserted into a video player in turn operably connected to a screen such as a television set screen in order that the video information may be displayed which is captured or retained on the video disc. Device 20 is designed to protect and hold the video disc which may be inserted into the video player as desired. Device 20 contains an outer housing or caddy 21 in which a video disc holder 22 is slidably mounted.

Caddy 21 is configured as a box with one open end to slidably receive disc holder 22. A pair of end walls 23 and 24 are joined to a pair of spaced apart main walls or side walls 25 and 26. Likewise, the bottom wall 27 is joined to the side walls and end walls. Wall 25 is shown as fragmented in order to partially illustrate the disc holder 22.

Figure 2:
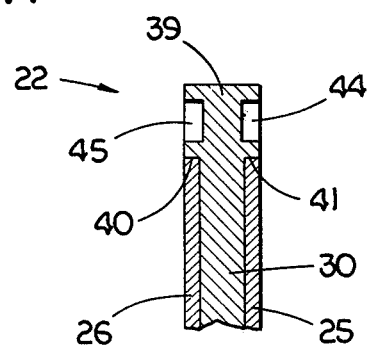
FIG. 2 is an enlarged fragmentary cross-sectional view taken along line 2—2 of FIG. 1 and viewed in the direction of the arrows.

Holder 22 (FIGS. 1 and 2) has a main body or wall 30 provided with a large aperture 28 seatingly receiving video disc 29. Once the caddy with video disc holder is inserted into a player, the caddy is removed and a rotatable turn table is moved toward holder 22 so as to engage and lift disc 29 from the holder for the playing of the disc. Once the disc playing is concluded, disc 29 is moved back onto holder 22 with caddy 21 then being reinserted into the player so as to recapture the video disc plus holder.

It is the practice to releaseably latch holder 22 to caddy 21 by means of a pair of spring-biased legs or caddy latches. Wall 30 of holder 22 is provided with a pair of spring-biased legs 31 and 32 which respectively releasably engage end walls 23 and 24 of caddy 21. Each leg is provided with a projection which extends into a complementarily sized notch provided in the adjacent end wall. For example, leg 31 includes a projection 33 which extends into notch 34 of end wall 23. The leg is integrally attached at its proximal end to wall 30 of the holder whereas the distal end is spaced sufficiently apart from wall 30 to allow the leg to move or be pried away from the adjacent end wall of the caddy. It can be apreciated that holder 22 may be produced from a variety of materials to provide the spring action. For example, a suitable plastic could provide the suitable spring action for legs 31 and 32. It will be noted that projection 33 has a surface 35 perpendicularly arranged to the leg and to the direction of withdrawal of the holder from the caddy so as to engage surface 36 of notch 34 preventing removal of the holder from the caddy until the legs are pivoted toward one another. Further, each projection is provided with an inclined surface 37 to engage the leading edge of the caddy to allow the legs to automatically pivot toward one another when the caddy is slipped back onto the holder and eventually the projections extend into the notches of each caddy end wall. Each leg 31 and 32 is provided with an inclined surface 38 at the distal end of each leg which diverges from its respective adjacent caddy end wall to allow insertion of a pair of pry bars against each surface 38 and then between a leg and adjacent caddy end wall so as to disengage leg projection 33 from notch 34 and allow the holder to be removed from the caddy.

The outer end of disc holder 22 is provided with a head 39 which extends across the open end of the caddy between legs 31 and 32 forming a pair of ledges 40 and 41 contactingly receiving side walls 26 and 25 of the caddy when the holder is inserted into the caddy. Further, four recesses are provided in heat 39 to receive a hooking mechanism for holding the video disc holder within the player as the caddy is removed therefrom. For example, a pair of recesses 42 and 43 are provided in head 39 at the end adjacent leg 31 whereas a second pair of recesses 44 and 45 are provided at the end of head 39 adjacent leg 32.

Figure 3:
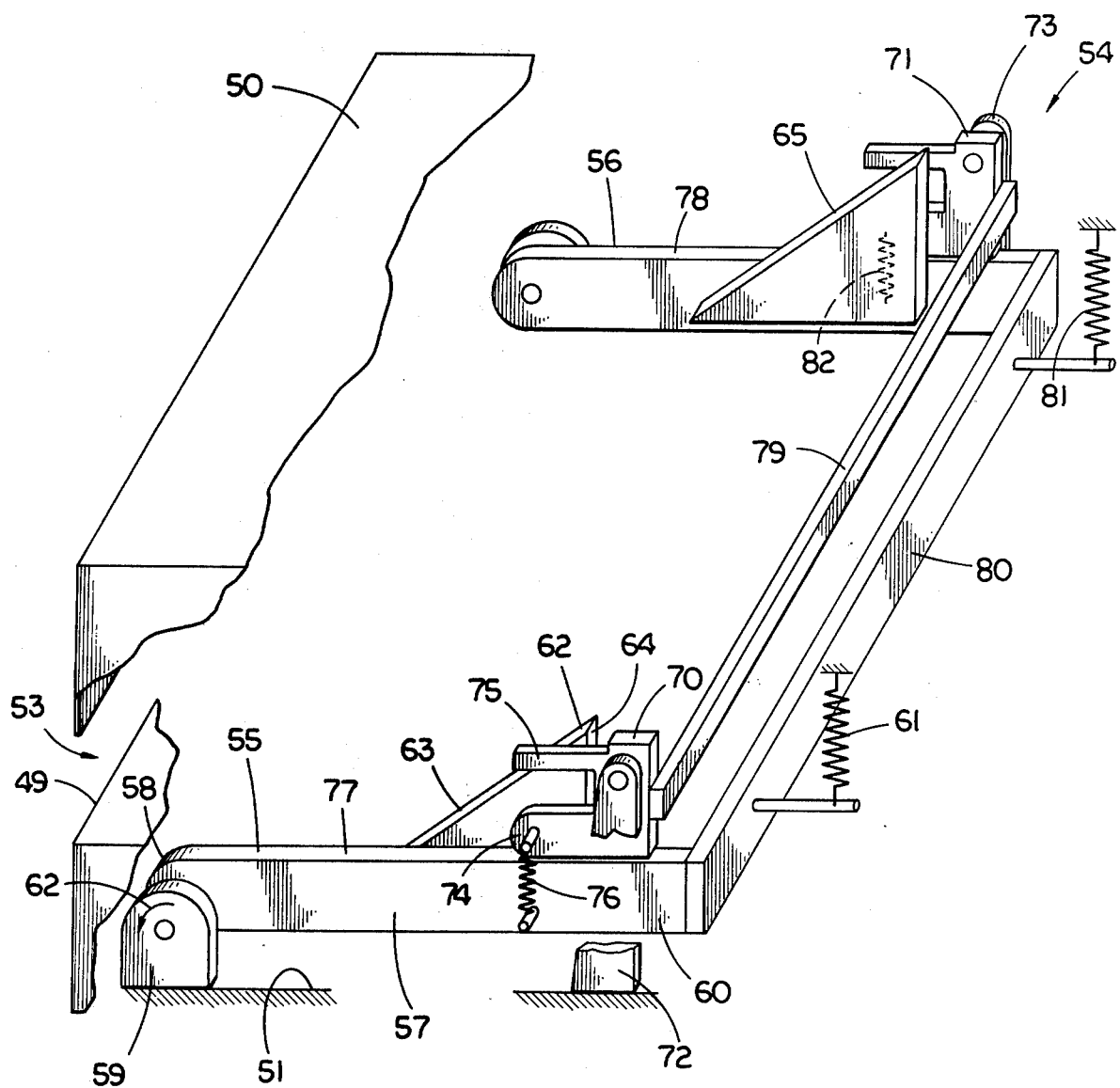
FIG. 3 is a fragmentary perspective view of a player incorporating the mechanism for use with the device shown in FIG. 1.

The preferred embodiment of the mechanism located within the player for engaging the holder and caddy shown in FIG. 1 is illustrated in FIG. 3. Player 50 includes a main frame 51 with a slotted opening 53 into which the caddy with holder may be inserted. The means for picking the video data from the video disc and displaying the data on a screen is not a part of this invention and is henceforth not shown. Needless to say, a stylus or some type of pickup device would be necessary to gather the intelligence from the video disc.

The latching mechanism 54 for operation with the disc holder enclosed in a caddy includes a pair of hooks 55 and 56 movably mounted to frame 51. Hook 55 will now be described, it being understood that a similar description applies to hook 56. Hook 55 includes a bar-shaped main body 57 having a forward end 58 pivotally mounted to block 59 in turn attached to frame 51. The rearward end 60 of main body 57 is spring-biased in the upward direction by a spring which may include a helical spring 61 having one end attached to end 60 and with the opposite end of the spring attached to the frame of player 50 thereby urging hook 55 to pivot in the direction of arrow 62. It will be noted that hook 55 is pivotally mounted to the frame so as to move in a first plane which is vertical and perpendicular to the direction of caddy insertion into player 50.

A wedge-shaped projection 62 is fixedly mounted to the side of main body 57 and has an inclined plane 63 which extends upwardly from main body 57 in a direction from forward end 58 to rearward end 60. A vertical stop surface 64 is provided on the rearward edge of projection 62. An identical wedge-shaped projection 65 is mounted to the inward side of hook 56 in a location directly opposite of projection 62. Projections 62 and 65 are provided to engage recesses 43 and 44 or recesses 42 and 45 when the caddy with holder is inserted into the player as will be discussed at a later point in this specification.

A pair of prying devices or pryors 70 and 71 are pivotally mounted to frame 51 by a pair of mounting blocks 72 and 73 with mounting block 72 shown fragmented in FIG. 3 to more clearly illustrate the mechanism. Each pryor 70 and 71 moves in a direction parallel to the plane of movement of hooks 55 and 56.

Pryor 70 will now be described, it being understood that a similar description applies to pryor 71. Pryor 70 has a main body with a pair of forwardly extending fingers 74 and 75. Finger 74 is connected to the main body 57 of hook 55 by means of a helical spring 76. Each pryor 70 and 71 rests initially upon the top surfaces 77 and 78 of the main bodies of hooks 55 and 56. Each pryor 70 and 71 is joined together by a cross shaft 79 to ensure that the pryors move in unison. Likewise, a second cross shaft 80 is connected to and between the rearward ends of hooks 55 and 56 to ensure that the hooks move in unison. A helical spring 81 is connected between frame 51 and the rearward end of hook 56 in a manner identical to the connection of spring 61 between frame 51 and hook 55. Likewise, another spring 82 connects together the main body of hook 56 and the lower finger of pryor 71 in a manner identical to the connection of helical spring 76 and finger 74.

Figure 4:
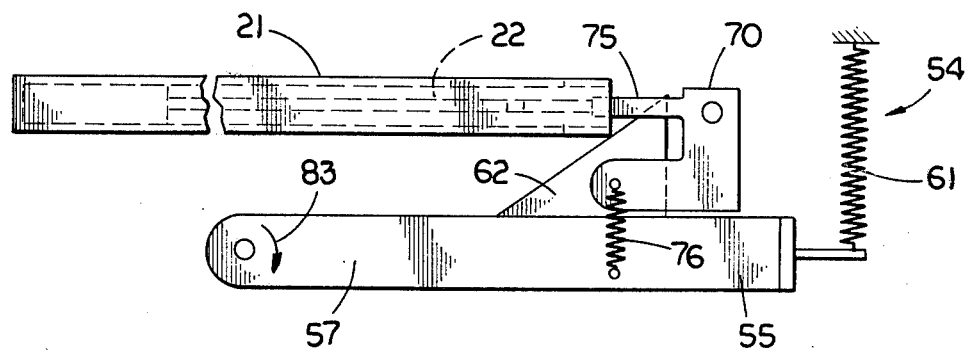
FIG. 4 is an end view of the mechanism of FIG. 3 only showing the caddy being initially inserted into the player.
Figure 5:
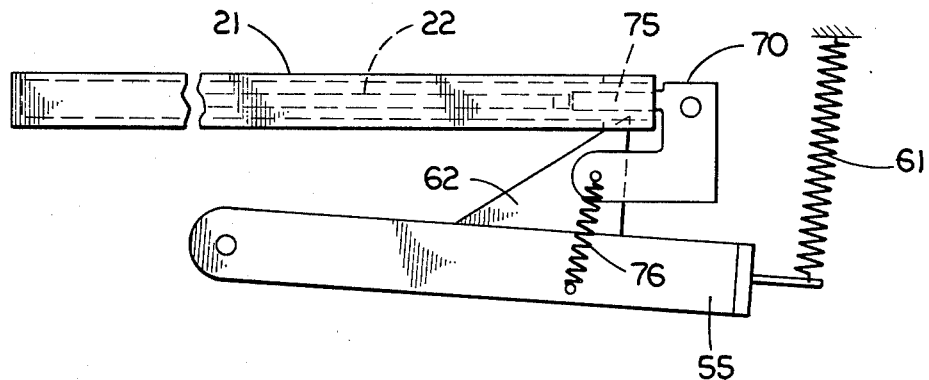
FIG. 5 is the same view as FIG. 4 only showing the position of the mechanism which has unlatched the disc holder from the caddy and latched the holder to the mechanism.
Figure 6:
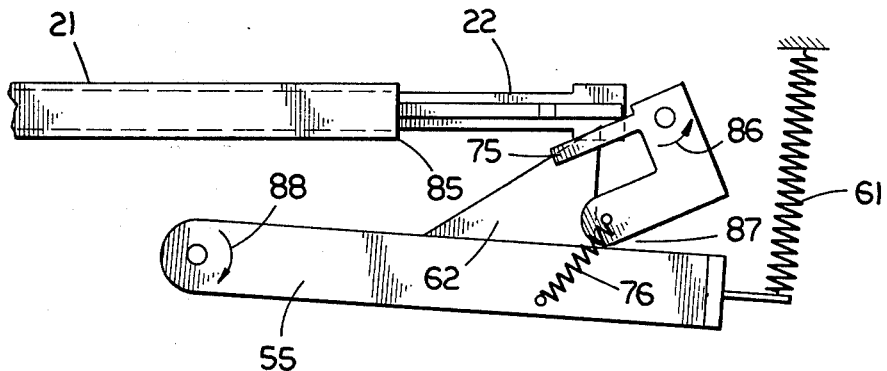
FIG. 6 is the same view as FIG. 5 only showing the caddy removed from the player and the holder latched thereto.

The operation of the device will now be described by referring to FIGS. 4–8. FIG. 4 schematically illustrates the position of the latching mechanism 54 with the caddy 21 and accompanying holder 22 being initially inserted into the player. First, the upper fingers or pry bars of pryors 70 and 71 extend between the spring-biased legs 31 and 32 of holder 22 and the adjacent end walls of the caddy. Continued movement of the caddy with disc holder into the player results in the holder head 39 contacting the inclined surface of the wedge projection of hook 55 forcing the main body 57 of hook 55 to pivot in the direction of arrow 83 from the position in FIG. 4 to the position in FIG. 5. Likewise, the upper finger or pry bar 75 of each pryor extends further into and between the caddy and disc holder until eventually the disc holder 22 is completely unlatched from caddy 21 and the wedge-shaped projections 62 and 65 extend into either recesses 43 and 44 or recesses 42 and 45, depending upon which side of the caddy and holder faces upwardly. As will be noted in FIG. 5, the main bodies of the hooks have pivoted downward so that each hook is spaced apart from each pryor. For example, hook 55 is spaced apart from pryor 70. Once the wedge-shaped projections have snapped into the recesses provided in the head 39 of the disc holder, the caddy may then be removed. As shown in FIG. 6, caddy 21 is being withdrawn from the player while the disc holder 22 is securely held within the player by the wedge-shaped projections. Once caddy 21 is removed from the player, the disc held by holder 22 is engaged by the rotatable turntable for the playing thereof.

Springs 76 and 82 are operable to pivot pryors 70 and 71 in such a manner that the top fingers or pry bars are pivoted downward beneath holder 22 so as to not interfere with any mechanism located above the holder for the video pickup such as a stylus. For example, pry bar 75 of pryor 70 (FIG. 6) is pivoted downward toward main body 57 of hook 55 once caddy 21 is withdrawn.

Figure 7:
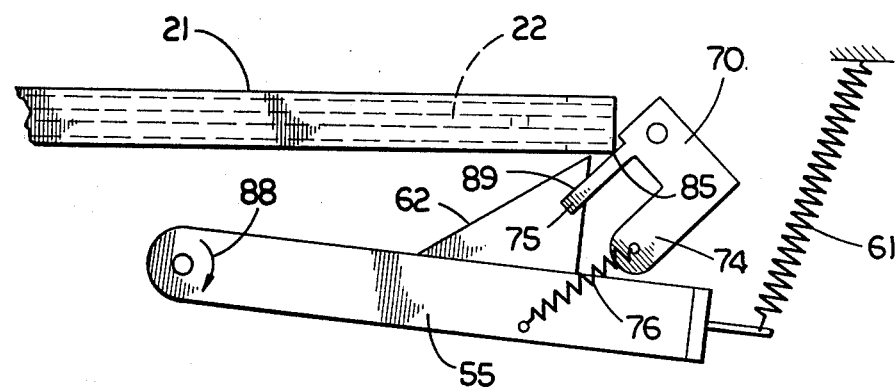
FIG. 7 is the same view as FIG. 6 only showing the caddy recapturing the holder which is disengaged from the mechanism.

Upon completion of the playing of the video disc, the caddy may be reinserted into the player so as to recapture the video disc and holder and be withdrawn from the player. As caddy 21 is being reinserted into the player, the lower edge 85 of caddy 21 (FIG. 6) will contact the upper surface of each pry bar so as to cause pryors 70 and 71 to pivot further in the direction of arrow 86 thereby causing the forward rounded cam surface of the lower finger of each pryor to press against the main body of each hook causing the hooks 55 and 56 to pivot further in the direction of arrow 88 until the wedge-shaped projections are disengaged from the recesses provided in the head of the disc holder. For example, lower edge 85 of caddy 21 is shown in FIG. 7 as contacting the top surface 89 of pry bar 75 causing pryor 70 to rotate further in a counterclockwise direction and causing the rounded lower edge or cam surface 87 (FIG. 6) of the lower finger 74 to contact the upper surface of main body 57 causing the main body 57 of hook 55 to pivot further in the direction of arrow 88 until wedge-shaped projection 62 is disengaged from the holder recess. Thus, the spring-biased legs of the holder will snap back into place into the complementary notches provided on the inside surface of the end walls of the caddy providing for the latching of the disc holder to the caddy and allowing the caddy with disc holder to be withdrawn from the player. Springs 61 and 81 are then operable to urge hooks 55 and 56 to pivot in a direction opposite of arrow 88 thereby positioning the hooks and pryors in the initial insertion position shown in FIG. 4.

Figure 8:
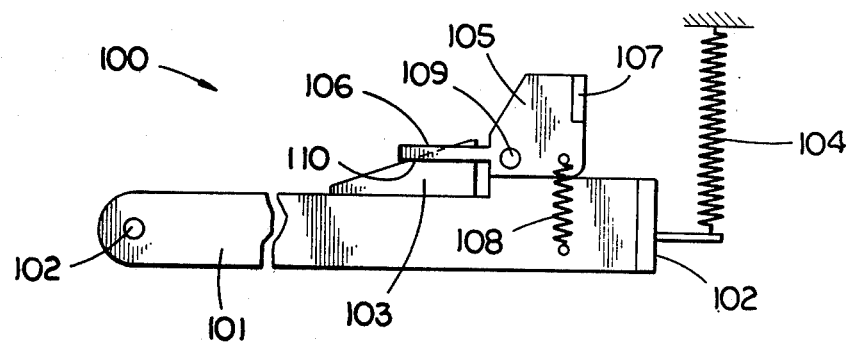
FIG. 8 is a side view of an alternate embodiment of the mechanism.

An alternate embodiment of the mechanism shown in FIGS. 4–7 is illustrated in FIG. 8. The mechanism of FIG. 8 is identical with the preferred embodiment shown in FIGS. 4–7 with the exception that the springs connecting the pryors to the hooks are arranged behind the pivot points of the pryors in lieu of forwardly thereby causing the pryors to pivot upwardly instead of downwardly. Mechanism 100 includes a pair of parallel hooks identical to hooks 55 and 56 each of which is provided with a wedge-shaped projection and with each hook connected together to move in unison by a cross bar. Thus, only a side view of mechanism 100 has been shown since the prior description for mechanism 54 is applicable. Mechanism 100 therefore includes a first hook 101 pivotally mounted about pivot point 102 in turn mounted to the frame of the player. The rearward end of hook 101 is connected to the other hook not shown by a cross shaft 102 so as to move in unison. Likewise, hook 101 is provided with a wedge-shaped projection 103 as is the other hook which is not shown so as to project into the recesses provided in the head of the video disc holder. A pair of springs such as helical spring 104 have first ends connected to the frame of the player and opposite ends connected to the rearward end of the hooks so as to urge the wedge-shaped projections into the recesses of the video disc holder.

The pair of pryors of mechanism 100 are slightly different from pryors 70 and 71 in that the pryors of mechanism 100 have only a single finger for each pryor extending forwardly. Thus, pryor 105 includes a forwardly extending finger or pry bar 106 which is operable to extend into the caddy between the caddy and disc holder so as to pry the spring-biased legs apart from the caddy to allow for the unlatching of the disc holder from the caddy. The second pryor of mechanism 100 has a pry bar identical to pry bar 106 and is not shown. Likewise, the pair of pryors are interconnected together by a cross shaft 107 identical to cross shaft 79 which extends between and connects together the pair of pryors to ensure that the pryors move in unison. A pair of helical springs are attached to and between the main body of the hooks and the rearward end of the pryors. For example, helical spring 108 is connected between hook 101 and the rearward end portion of pryor 105 aft of the pivot point 109 thereby causing pry bar 106 to pivot upwardly as the caddy is withdrawn from the player and the video disc holder is latched to the wedge-shaped projections. Thus, the top edge of the caddy contacts the bottom surface 110 of each pry bar when the caddy is reinserted to recapture the video disc holder thereby causing the rear cam surface to contact the top surface of the main body of the hook causing further downward movement of the hook until the wedge-shaped projections are disengaged from the recesses provided in the video disc holder.

Many variations are contemplated and included in the present invention. For example, the various parts of the mechanism such as shown in FIG. 3 may be mounted by a variety of means. Likewise, it is possible to split a single part into two separate pieces which are connected together so as to act in unison. Such variations are adaptations of my invention and are herein protected.

The pryors are pivotally mounted to the frame so as to move parallel to a vertical plane from an initial inserting position shown in FIG. 4 to a removal position shown in FIG. 6. Each pryor is provided with an unlatching means operable to unlatch the holder from the caddy. The unlatching means includes the pry bar such as pry bar 75 (FIG. 5). Each pryor also is provided with a control surface or cam surface such as surface 87 for forcing the hooks downwardly to allow for disengagement of the wedge-shaped projections from the disc holder. The hooks move in a direction parallel to the vertical and include wedge-shaped outer ends to hookingly engage the holder when the caddy is unlatched and removed apart from the holder.

The springs attached to the rearward end of the hooks such as springs 61, 81 and 104 are operable to urge the wedge-shaped projections of the hooks into latching engagement with the disc holder when the holder is inserted into the frame. These same springs are yieldable to allow movement of the wedge-shaped projections to disengage the disc holder when the caddy is reinserted into the frame to recapture the holder with the caddy contacting and forcing the pryors to move to the removal position shown in FIGS. 6 and 7 thereby moving the camming surfaces against the hooks and moving the hooks away from the disc holder.

The remaining springs such as springs 76, 82 and 108 connect the pryors and hooks together and are operable to urge the pry bars away from the disc holder once the wedge-shaped projections are latched to the disc holder and the caddy is removed from the player. In the version shown in FIG. 3, springs 76 and 82 are operable to urge the pry bars downwardly toward the latches or hooks 55 and 56 when the pryors move apart from the hook (FIG. 5) and the caddy is then removed from the player (FIG. 6). On the other hand, the pair of springs, one of which is shown as spring 108 (FIG. 8) connecting the pryors and hooks together are operable to urge the pry bars away from the hooks or above the disc holder when the disc holder is latched in place to the player and the caddy is being removed therefrom.

Suitable guiding means is provided within player 50 (FIG. 3) so as to define a horizontal plane to receive the caddy and holder with the plane being arranged perpendicularly to the plane of movement of pryors 70 and 71 and hooks 55 and 56. The guiding means may include the forward edge 49 of the player in conjunction with other suitably arranged guide rails.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A device for removing and reinserting a playing disc holder enclosed in and releasably latched to a caddy comprising:
   a frame into which said caddy with holder may be inserted;
   a first pryor pivotally mounted to said frame to move parallel to a given plane from an initial inserting position to a removal position and having first unlatching means operable to unlatch said holder from said caddy when said caddy and holder are initially inserted into said frame positioning said unlatching means between said caddy and holder in said initial inserting position, said pryor having a control surface;
   a first hook movably mounted to said frame to move in a direction parallel to said plane, said hook including an outer end configured to hookingly engage said holder when said caddy is unlatched and removed apart from said holder;
   first spring means secured to said frame and said hook being operable to urge said outer end of said hook into latching engagement with said holder when said holder is inserted into said frame but yieldable to allow movement of said outer end of said hook to disengage said holder when said caddy is reinserted into said frame to recapture said holder contacting and forcing said pryor to move to said removal position and moving said control surface against said hook moving said hook from said holder; and
   second spring means connecting said pryor and hook together being operable to urge said unlatching means away from said holder once said first hook is latched to said holder and said caddy is removed therefrom.

2. The device of claim 1 wherein said frame includes guiding means defining a plane to receive said caddy and holder perpendicularly arranged to said given plane of movement of said pryor and hook.

3. The device of claim 2 and further comprising:
   a second pryor pivotally mounted to said frame to move parallel to said first pryor, said unlatching means includes a first pry bar and said second pryor includes a second pry bar with said first pry bar and second pry bar being spaced apart to extend on opposite edges of said holder between said holder and said caddy when inserted into said frame;
   a first cross shaft extending between and connecting together said first pryor and second pryor to ensure said first pryor and second pryor move in unison;
   a second hook movably mounted to said frame and including an outer end to hookingly engage said holder, said first hook and said second hook being pivotally mounted to said frame;
   a second cross shaft extending between and connecting together said first hook and said second hook to ensure said first hook and said second hook move in unison; and third spring means urging said second pryor and said second hook together.

4. A latch mechanism for operation with a disc holder enclosed in a caddy comprising:
- a frame having an opening to receive said holder in caddy;
- a first pryor pivotally mounted to said frame to move in a first plane and including a bar extending forwardly toward said opening to engage and separate said caddy and holder, said pryor having a pryor seating surface;
- a first latch pivotally mounted to said frame to move in a direction parallel to said first plane, said latch having a main body with a latch seating surface which said pryor seating surface contacts, said latch having a projection outwardly therefrom to hookingly engage said holder when separated from said caddy;
- a first spring mounted on said frame and connected to said latch to urge said projection into said holder; and
- a second spring connecting said pryor and latch together to urge said pryor toward said latch and said bar away from said holder when said pryor seating surface is not in contact with said latch seating surface.

5. The latch mechanism of claim 4 wherein said projection on said latch is wedge-shaped with an inclined surface and a holding surface, said inclined surface extends rearwardly from said main body of said latch to said holding surface; and
said first spring is yieldable to allow said latch to pivot and away from said pryor when rearwardly directed force is applied to said pryor by said caddy being inserted into said frame.

6. The latch mechanism of claim 4 wherein said pryor has a camming surface contacting said latch seating surface and forcing said latch away from said holder when said bar is pivoted toward said latch.

7. A latch mechanism for operation with a holder in a caddy comprising:
- a frame;
- a first latch having a first end and a second end with said first end pivotally mounted to said frame, said latch having a wedge-shaped hook extending upwardly therefrom in a direction from said first end toward said second end to engage said holder;
- first spring means mounted on said frame and connected to said second end to urge said hook upwardly in a given plane;
- a first pryor pivotally mounted to said frame to move parallel to said given plane and having a finger extending in a direction from said second end toward said first end, said pryor contacting said latch and moving said latch from said holder when said caddy is reinstalled on said holder while moving said pryor; and
- a second spring connected to and between said latch and pryor to urge said latch and pryor together.

8. The latch mechanism of claim 7 and further comprising a second latch pivotally mounted to said frame parallel to but spaced from said first latch with an identical pivot axis and also including a second wedge-shaped hook extending upwardly therefrom;
- a second pryor pivotally mounted to said frame;
- a third spring connected to and between said second latch and said second pryor to urge them together; and
- unison means connecting said first pryor to said second pryor and connecting said first latch to said second latch to ensure movement of said first pryor and second pryor in unison and movement of said first latch and second latch in unison.

9. The latch mechanism of claim 7 wherein said second spring is operable to urge said finger toward said latch when said latch and pryor move apart.

10. The latch mechanism of claim 7 wherein said second spring is operable to urge said finger away from said latch when said latch and pryor move apart.

11. A latch mechanism for operation with a holder enclosed in a caddy comprising:
- a frame having an opening to receive said holder in caddy;
- a first pryor movably mounted to said frame to move in a first plane and including a bar extending forwardly toward said opening to engage and separate said caddy and holder, said pryor having latch-actuating means;
- a first latch movably mounted to said frame to move in a direction parallel to said first plane, said latch having a main body which said latch-actuating means actuates, said latch having a projection outwardly therefrom to hookingly engage said holder when separated from said caddy;
- means associated with said latch to urge said projection into said holder and further associated with said latch-actuating means of said pryor and said latch to urge said latch away from said holder when said caddy is reinstalled on said holder forcing said latch-actuating means of said pryor to move said latch from said holder.

12. The mechanism of claim 11 wherein said first plane extends vertically.

* * * * *